A. SCHWEIZER.
VALVE.
APPLICATION FILED APR. 8, 1912.
1,045,619.
Patented Nov. 26, 1912.
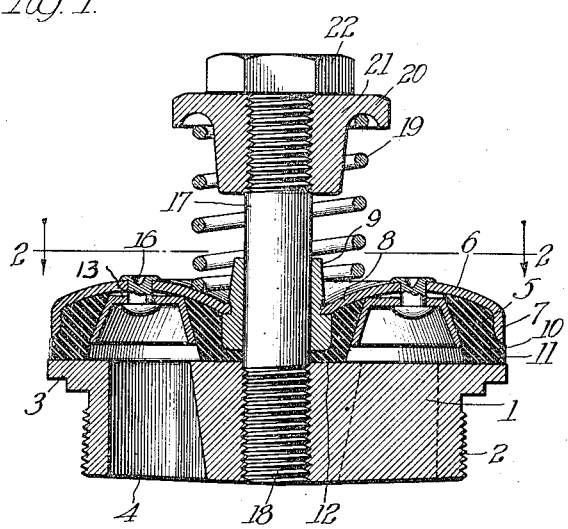
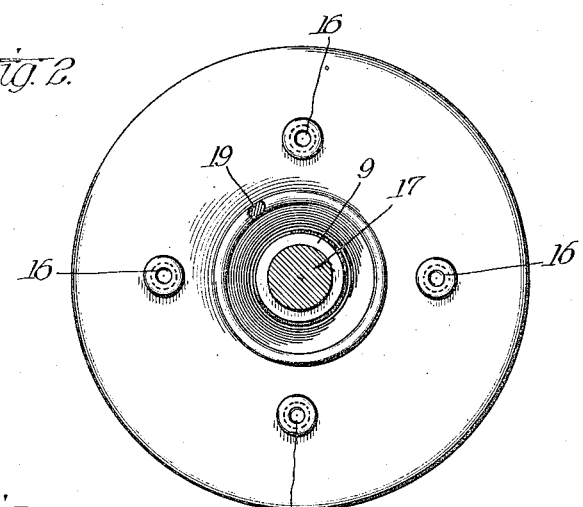
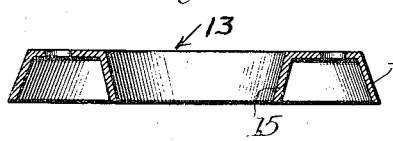
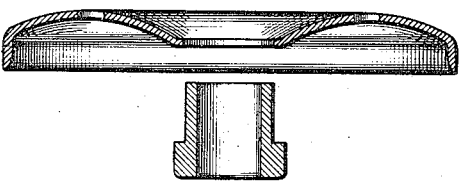
Witnesses:
Robert H. Weir
H. Perry Hahn
Inventor:
Adolf Schweizer.
By Jmes. Addington, Ames & Siebold
Attys

UNITED STATES PATENT OFFICE.

ADOLF SCHWEIZER, OF CHICAGO, ILLINOIS, ASSIGNOR TO THE HILL PUMP VALVE CO., OF CHICAGO, ILLINOIS, A CORPORATION OF ILLINOIS.

VALVE.

1,045,619.  Specification of Letters Patent.  Patented Nov. 26, 1912.

Application filed April 8, 1912. Serial No. 689,172.

*To all whom it may concern:*

Be it known that I, ADOLF SCHWEIZER, a citizen of the United States, residing at Chicago, in the county of Cook and State of Illinois, have invented new and useful Improvements in Valves, of which the following is a full, clear, concise, and exact description, reference being had to the accompanying drawings, forming a part of this specification.

My invention relates to improvements in valves, and particularly to clap valves for use in pumps and the like.

One of the objects of my invention is to improve the construction of certain parts of the valve whereby the same may be efficient in operation and may be manufactured at a minimum expense.

For the purpose of disclosing my invention I have illustrated in the accompanying drawings one embodiment thereof.

In said drawings—Figure 1 represents a transverse sectional view of a valve embodying my invention; Fig. 2 is a top plan view thereof; Fig. 3 is a disassembled sectional view of the backing plate of the valve and thimble; and Fig. 4 is a transverse sectional view of the clamping ring of the valve.

Referring to the embodiment of my invention illustrated, the valve seat comprises a circular seating member 1, screw threaded as at 2 and having an annular rim as at 3. Suitable ports or openings 4 extend through the seat to permit the water to pass therethrough when the valve 5 thereof is opened. The valve 5 comprises a backing plate 6, which is stamped out of sheet metal and is provided with a downwardly extending annular flange 7. The center of this backing plate is concaved, as at 8, to give strength and rigidity to the plate. This plate is provided with a thimble 9 which passes through a central opening in the plate and is swaged over the side walls of the opening to hold the thimble in place.

Secured to the face of the plate 6 are packing rings 11 and 12 which are held in position by means of the clamping ring 13. This ring fits between the packing rings and is provided with wedge-shaped surfaces 14 and 15 which tend to hold the packing in position. The clamping ring, like the backing plate, is stamped from sheet metal and is secured to the backing plate by means of suitable rivets 16. The valve is guided by a suitable stem 17, screw threaded as at 18, into the valve seat, and provided with a coiled spring 19 interposed between the backing plate and shoulder 20 formed on a nut 21 secured on the stem 17. This coiled spring serves to hold the valve seated. A suitable locking nut 22 prevents the nut 21 from becoming disengaged from the stem.

Having thus described my invention, what I claim as new and desire to secure by Letters Patent, is—

1. A clap valve comprising a backing plate formed of sheet metal having a central thimble swaged over the walls of a central opening in said backing plate, packing rings for said backing plate, and a clamping ring for securing said packing rings to said backing plate.

2. A clap valve comprising a backing plate stamped from sheet metal and having downwardly extending annular flanges, a thimble for said backing plate extending through the central opening therein and swaged over the walls of said opening for securing it in position, packing rings for said backing plate, and a clamping ring for holding said packing rings in position stamped from sheet metal and fastened to said backing plate.

3. A clap valve comprising a backing plate formed from sheet metal having a central opening therein, a thimble extending through said opening, packing rings for said backing plate, and a clamping ring for securing said packing to the backing plate.

4. A clap valve comprising a backing plate stamped from sheet metal having a central opening and downwardly extending annular flanges, a thimble for said backing plate extending through said central opening, packing rings for said backing plate, and a clamping ring for holding said packing in position also stamped from sheet metal and fastened to said backing plate.

In witness whereof, I have hereunto subscribed my name in the presence of two witnesses.

ADOLF SCHWEIZER.

Witnesses:
W. PERRY HAHN,
MABEL REYNOLDS.